United States Patent [19]

Mizuhara

[11] Patent Number: 4,528,247
[45] Date of Patent: Jul. 9, 1985

[54] STRIP OF NICKEL-IRON BRAZING ALLOYS CONTAINING CARBON AND PROCESS

[75] Inventor: Howard Mizuhara, Hillsborough, Calif.

[73] Assignee: GTE Products Corporation, Stamford, Conn.

[21] Appl. No.: 500,113

[22] Filed: Jun. 1, 1983

[51] Int. Cl.³ .................................................. C22C 19/03
[52] U.S. Cl. .................................... 428/606; 148/403; 419/12; 420/452; 420/459
[58] Field of Search ................ 420/459, 452; 148/403, 148/427; 428/606; 419/12

[56] References Cited

U.S. PATENT DOCUMENTS 2,880,086  3/1959  Cape ..................................... 420/459
4,404,049  9/1983  Tanaka et al. ....................... 148/427

*Primary Examiner*—R. Dean
*Attorney, Agent, or Firm*—Donald R. Castle

[57] ABSTRACT

Low levels of carbon in nickel based brazing alloys containing controlled levels of iron and boron and optionally chromium and silicon yield lower melting points, improve the contact angle and yield harder brazed joints than similar alloys without carbon addition.

3 Claims, No Drawings

STRIP OF NICKEL-IRON BRAZING ALLOYS CONTAINING CARBON AND PROCESS

FIELD OF INVENTION

This invention relates to brazing alloys. More particularly it relates to alloys containing nickel as the major component and iron at controlled levels and small amount of carbon as a melting point depressant.

BACKGROUND OF THE INVENTION

U.S. Pat. No. 2,880,086 discloses nickel-iron alloys containing 51% to 85% by weight of nickel, 0 to 10% by weight of chromium, 0 to 10% by weight of manganese, 1% to 5% by weight of boron, 0.25 to 5% by weight of silicon and from 6% to 40% by weight of iron. Iron depresses the melting point of the disclosed alloys which is desirable in many instances. It is particularly desirable in brazing certain stainless steels and superalloys which are used in certain jet engines because these alloys require solution heat treatment at about 1000°–1050° C. which is below the flow point of alloys without iron addition.

Carbon is present at levels below about 0.02% by weight in nickel base brazing alloys as an impurity.

It is advantageous to have an even lower melting point than the iron containing alloys and to decrease the contact angle which results in better capillary flow.

SUMMARY OF THE INVENTION

In accordance with one aspect of this invention there is provided a nickel base brazing alloy consisting essentially of from about 6 to about 40% by weight iron from 0 to about 15% by weight chromium, from about 1% to about 6% by weight of boron, from 0 to about 6% by weight of silicon, from about 0.02% to about 1% by weight of carbon and from about 62% to about 94% by weight of nickel.

DETAILED DESCRIPTION OF THE PREFERRED EMBODIMENTS

For a better understanding of the present invention, together with other and further objects, advantages and capabilities thereof, reference is made to the following disclosures and appended claims in connection with the above description of some of the aspects of the invention.

Controlled low levels of carbon in the range of from about 0.02% to about 1% by weight when added to alloys similar to those disclosed in U.S. Pat. No. 2,880,086 mentioned previously have been found to significant improve the brazing qualities of melting point and contact angle. The brazed joints using the alloys with the carbon addition have higher hardness than those joints using a braze without the carbon.

The alloys of this invention can be produced in a variety of forms. If powders are desired numerous techniques can be employed. Gas atomization is one satisfactory technique wherein a molten stream of the alloy is fed into the throat of a nozzle and a gas at a relatively high pressure (150 to 300 pounds per square inch) hits the molten stream. The metal stream is broken up and solidifies as fine particles. Other techniques include the spinning disk wherein a molten stream is dropped onto a spinning disk and the centrifugal force causes particles of molten metal to be projected from the disk. The particles are cooled and solidified by a gaseous or liquid medium.

If desired, the alloy can be produced in the form of a quickly cooled sheet by directing a stream of molten metal onto the external surface of a rotating chill wheel. Depending upon the rapidity of cooling, an amorphous phase can be formed. Amorphous phase material and microcrystalline materials are more ductile than crystalline materials that are produced by slower cooling. Brazing sheets or foils are preferred over powders or pastes for some applications.

Additionally, a strip can be powder rolled from alloys having a slightly lower boron content than ultimately desired and after the strip is borided to bring the boron content to the desired level. A technique of boriding is disclosed in U.S. Pat. No. 3,753,794, however, in that process the depth of penetration is limited so as to have a boron-free core. In the practice of the present invention, there can be complete penetration of boron. The major criteria is that the predetermined levels in the final alloy strip are achieved. In such instances, the initial boron content is from about 40% to about 90% of the desired final boron content. For example, if it is desired to have a final boron content of 4% by weight, the initial alloy content can vary from about 1.6% by weight to about 3.6% by weight.

To more fully describe the subject invention the following detailed examples are presented. All proportions, percentages and parts are by weight unless otherwise indicated.

EXAMPLE 1

Four alloys are prepared by skull melting and the hardnesses are recorded and a small piece is used for differential thermal analysis to determine the melting temperature. A sample is used to braze "T" joints made from 410 stainless steel with gap opening from zero to ten mils by placing a small quantity of the brazing alloys at the zero gap end of the "T" joint. The brazing is carried out under $10^{-5}$ mm Hg vacuum at about 1025° C. for about 15 minutes at braze temperature.

|   | Ni    | Fe | Cr  | Si  | B   | C    | Lig/Sol. | Rockwell C |
|---|-------|----|-----|-----|-----|------|----------|------------|
| A | 82.27 | 3  | 6.5 | 4.8 | 3.4 | .026 | 1005/945 | 58.8       |
| B | 81.90 | 3  | 6.5 | 4.8 | 3.4 | 0.4  | 995/945  | 61.7       |
| C | 73.25 | 12 | 6.5 | 4.8 | 3.4 | 0.05 | 990/935  | 57.1       |
| D | 72.8  | 12 | 6.5 | 4.8 | 3.4 | 0.50 | 952/932  | 61.0       |

The results showed that unique properties do exist when iron and carbon are added to an alloy of NiFeCrBSi.

1. The addition of 0.4% carbon to 3% Fe alloy (A) lowers the m.p. of alloy (B) by about 10° C.
2. The addition of 0.5% carbon to 12 percent (C) iron alloy reduces the m.p. of alloy (D) by about 40° C.
3. The addition of only iron from 3 to 12 percent reduces the melting temperature by 15° C. (A to C).
4. The addition of iron to nickel alloy reduces the hardness (A & C) and (B & D).
5. Carbon-containing alloy started flow before the alloy containing about 0.026% carbon.

EXAMPLE 2

Following alloys are prepared by button melter and the prepared alloys are used to determine various brazing parameters.

|   | Ni | Fe | Si | B | C | Liq/Sol. | Microhardness Knoop |
|---|---|---|---|---|---|---|---|
| E | 94.47 | — | 3.3 | 2.2 | .03 | 1060/990° C. | 710 |
| F | 64.5 | 30 | 3.3 | 2.2 | .06 | 1010/930° C. | 480 |
| G | 64.0 | 30 | 3.3 | 2.2 | .55 | 990/925° C. | 525 |

The "T" joints made from 410 stainless steel are brazed at about 1050° C. for alloy E and about 1020° C. for alloys F & G for about 15 minutes soak under $10^{-5}$ mm Hg vacuum. The brazed joints are polished and the hardness is recorded.

The test showed that:
1. Addition of iron reduces hardness (E to F).
2. The addition of carbon increases hardness (F to G).
3. Substantial reduction in melting temperature is noted when iron is introduced to the alloy (E to F).
4. The addition of carbon further depresses the m.p. (F to G).
5. The study of alloy with increasing iron content to 40% iron showed a decrease in intergranular penetration into 410 stainless steel.

EXAMPLE 3

Two similar alloys are prepared by melting and casting into a ¾" diameter bar followed by quench cooling into a foil.

|   | Ni | Fe | Si | B | C | Melting Temperature |
|---|---|---|---|---|---|---|
| H | 62.55 | 30 | 4.5 | 2.9 | .05 | 990° C. |
| I | 92.55 |    | 4.5 | 2.9 | .05 | 1035° C. |

The prealloyed bar is placed in a closed end quartz tube with a 0.020" by 0.250" slot at the bottom end, and the cover at the opposite end is fitted with a tubing. The tubing is attached to an argon gas pressure reducer. An induction coil is used to melt the alloy and when fully melted, the argon gas adjusted to about 1 psi is used to drive out the molten metal on to a water cooled copper quench wheel spinning at 3000 surface feet per minute. A bright flexible foil measuring 1.7 to 2.2 mils thickness is produced.

The above alloys are used to prepare "T" brazes using cut pieces of 410 s.s. and brazes with alloys A and B are carried out simultaneously at about 1050° C. under about $10^{-5}$ mm Hg vacuum. The lower m.p. 30% Fe alloy (H) showed less alloy penetration into the 410 stainless than with alloy I.

EXAMPLE 4

As in Example 1, an alloy with following composition is melted and driven on to a copper quench wheel.
64.3% Ni, 30% Fe, 3.5% Si, 1.8% B, 0.4% C.

A flexible, bright foil about ¼" wide by 2.2 to 1.7 mil thickness is produced. A piece of above foil was placed between 410 stainless steel and brazed at 1025° C., under $10^{-5}$ mm Hg vacuum. A braze was also made from a flexible foil of AMS 4779A at 1075° C. under $10^{-5}$ mm vacuum. A polished section is made. The presence of iron and lower braze temperature braze showed minimal reaction with stainless steel when compared to AMS 4779A alloy.

EXAMPLE 5

As in Example 1, following alloy is produced by quenching.
73.95% Ni, 12% Fe, 7% Cr, 4% Si, 3% B, 0.05% C.

The foil ¼" wide×2.2 to 1.8 mil thickness, is bright and flexible.

A piece of above foil is placed between 410 stainless steel pieces.

A foil of AMS 4777A is placed between 410 stainless steel piece and both specimens are brazed at about 1040° C. under $10^{-5}$ mm Hg vacuum. A polished section of above specimen shows less reaction with the iron containing alloy and also the iron containing alloy is softer.

EXAMPLE 6

An iron containing alloy described in Example 1, 2 and 3 is gas atomized using a forming gas at an atomizing rate of about 300 lbs per hour.

The atomized powder is screened −325M (43 micron) and melting temperature determined by Differential Thermal Analyser, and found to correspond to respective alloy foil made by use of rotating quench wheel.

EXAMPLE 7

Two alloys with similar compositions except for the carbon content are atomized.

|   | Ni | Fe | Cr | Si | B | C |
|---|---|---|---|---|---|---|
| (Alloy J) | 73.25% | 12% | 6.5% | 4.8% | 3.4% | .05% |
| (Alloy K) | 72.8% | 12% | 6.5% | 4.8% | 3.4% | .5% |

The −325M fraction is screened out from each alloy and paste made from glycerol. "T" joints are assembled from 50 mil thickness 410 stainless steel, and about 0.1 gram of paste is placed at one end of the "T" joint.

Both assemblies are placed side by side in a vacuum furnace, and heated at about 3° C. per minute above 850° C. under $10^{-5}$ mm Hg vacuum. The alloy K with 0.5% carbon started to flow at 880° C., and alloy J with 0.05% carbon started to flow at 915° C. In both cases the flow was initiated below the alloy solidus temperature.

EXAMPLE 8

An alloy of 60% Ni, 36% Fe, 4% B, 0.05% C with a melting temperature of 1060° C. is melted and atomized and −325M portion screened for test. A paste of 90% alloy and 10% glycerol is applied at one end of 410 s.s test piece. A braze is made at 1085° C. under $10^{-5}$ mm Hg vacuum with excellent results.

EXAMPLE 9

As in Example 3, the quench wheel speed is reduced to about 2500 surface feet per minute and gas pressure increased to about 2 psi resulted in about 5 mil thickness foil. The thin foil shows flexibility. X-ray analysis shows that up to about 2.5 mil thickness the foil is substantially amorphous, whereas in foils having a thickness of about 4 to 5 mil foil is crystalline. The 5 mil foil is used to make complex shaped preforms by photolithographic process and chemical etching.

While there has been shown and described what are at present considered the preferred embodiments of the invention, it will be obvious to those skilled in the art that various changes and modifications may be made therein without departing from the scope of the invention as defined by the appended caims.

What is claimed is:

1. A metallic strip consisting essentially of a nickel based brazing alloy consisting essentially of from about 6% to about 40% by weight iron, from 0 to about 15% by weight of chromium, from about 1% to about 6% by weight of boron, from 0 to about 6% by weight silicon, from about 0.02% to about 1% by weight of carbon and from about 60% to about 92.9% by weight of nickel, said strip having a thickness of from about 0.5 to 5 mils.

2. A metallic strip according to claim 1 wherein said strip contains at least some amorphous metal.

3. A process for producing a metallic strip having a predetermined boron content comprising (a) compacting an alloy consisting essentially of from about 6% to about 40% by weight of iron, from 0 to about 15% by weight of chromium, from about 0 to about 6% by weight of silicon, from about 0.02% to about 1% by weight of carbon, from about 60% to about 92.9% by weight of nickel and a boron content of from about 40% to about 90% of said predetermined boron content to form a strip and (b) boriding resulting strip for a sufficient time to achieve said predetermined boron content of from about 1% by weight to about 6% by weight of the resulting borided product.

* * * * *